(12) United States Patent
Bettcher et al.

(10) Patent No.: US 6,183,792 B1
(45) Date of Patent: Feb. 6, 2001

(54) METHOD OF BREADING FOOD PRODUCTS

(75) Inventors: Lane Bettcher, Huron; Jeffrey A. Whited, Amherst, both of OH (US)

(73) Assignee: Bettcher Industries, Inc., Birmingham, OH (US)

( * ) Notice: Under 35 U.S.C. 154(b), the term of this patent shall be extended for 0 days.

(21) Appl. No.: 09/273,873

(22) Filed: Mar. 22, 1999

Related U.S. Application Data (63) Continuation-in-part of application No. 09/021,654, filed on Feb. 10, 1998, now Pat. No. 5,924,356.

(51) Int. Cl.[7] .................................................. A23L 1/36
(52) U.S. Cl. ............................. 426/289; 426/89; 426/92; 426/96; 118/26; 118/30
(58) Field of Search .................................. 426/289, 292, 426/296, 94–96, 89, 92; 118/16, 24, 26, 30

(56) References Cited

U.S. PATENT DOCUMENTS

| | | |
|---|---|---|
| 895,856 | 8/1908 | Harton . |
| 910,812 | 1/1909 | Harton . |
| 2,509,533 | 5/1950 | Schoen, Jr. . |
| 2,855,893 | 10/1958 | Greer et al. . |
| 3,589,274 | 6/1971 | Murray ................................... 99/349 |
| 3,735,726 | 5/1973 | Butler ..................................... 118/24 |
| 3,739,743 | 6/1973 | McKee, Jr. ......................... 99/494 X |
| 3,967,583 | 7/1976 | Booth ..................................... 118/16 |
| 4,497,244 | 2/1985 | Koppens ......................... 99/450.1 X |
| 5,020,427 | 6/1991 | Kennefick et al. ................ 99/516 X |
| 5,052,330 | 10/1991 | Stacy ................................. 118/312 X |
| 5,160,377 | 11/1992 | Montemayor et al. ................. 118/13 |
| 5,226,354 | 7/1993 | Stewart ..................................... 99/494 |
| 5,236,502 | 8/1993 | Wadell ............................... 118/13 X |
| 5,238,493 | 8/1993 | Miller ............................... 99/494 X |
| 5,284,514 | 2/1994 | Griffiths ............................ 99/494 X |
| 5,318,629 | 6/1994 | Raque et al. ........................... 118/18 |
| 5,463,938 | 11/1995 | Sarukawa et al. ..................... 99/352 |
| 5,514,399 | 5/1996 | Cordera et al. ....................... 426/295 |
| 5,643,361 | 7/1997 | Wadell ............................... 494/18 X |
| 5,664,489 | 9/1997 | Herrick, IV ............................ 99/494 |
| 5,707,448 | 1/1998 | Cordera et al. .................... 99/494 X |

OTHER PUBLICATIONS

"SBB Batter–Breader," Bettcher Industries, Inc., Feb., 1997, 1 Sheet.
"The No Paper Continuous Hot Oil Filter," Sam Stein Assocites Inc., 1 sheet, no date.

*Primary Examiner*—Milton Cano
(74) *Attorney, Agent, or Firm*—Watts Hoffman Fisher & Heinke (57) ABSTRACT

A food product breading machine comprising a breading material reservoir, a breading station, a food product loading location, a discharge location from which breaded food products are discharged from the machine, and a perforate conveyor belt extending through the reservoir, the loading location, the breading station, and the discharge location. Breading material exiting the breading station falls through the conveyor and a reservoir intake opening below the conveyor belt between the breading station and the discharge location. Breaded food products remain on the belt and are conveyed to the discharge location. A breading support member is movable to a position beneath the conveyor belt between the breading station and the discharge location for preventing breading material from falling from the conveyor through the reservoir intake opening so that breading material is conveyed to the discharge location and the reservoir is emptied. A breading deflector flange projects from a reservoir wall toward the loading location for deflecting packed breading material being conveyed to the loading location that would otherwise spill from the reservoir. A one-piece breading flow restrictor defines a projecting lobe that mounds breading material at the breading station and assures that flat food products passing the breading station are fully breaded.

6 Claims, 4 Drawing Sheets

Fig.1

METHOD OF BREADING FOOD PRODUCTS

RELATE BACK

This is a continuation-in-part of U.S. application Ser. No. 09/021,654, filed Feb. 10, 1998, now U.S. Pat. No. 5,924,356.

FIELD OF THE INVENTION

The present invention relates to breading machines and more particularly to breading machines used in commercial food preparation establishments with various kinds of breading materials and food products, and where the equipment must be disassembled and cleaned at regular, frequent intervals.

BACKGROUND

Breading machines are used in commercial food preparation settings where breaded food products must be supplied for frying or other cooking processes in large quantities on short notice. Fast food restaurants specializing in fried chicken, fish, etc. are exemplary of such settings. Typically, a food product coated with a batter of some sort is placed in a breading machine and conveyed to a breading station. The breading machines are constructed with reservoirs sized to contain significant amounts of breading material. The breading material is particulate and, when conveyed through the breading machine, tends to flow like a fluid. Breading material is conveyed through the reservoir with the food product to the breading station. The battered food product is coated with breading material at the breading station. The breaded product is then discharged from the machine and breading material that does not adhere to the product is recycled through the breading machine reservoir.

After use for a time, recycled breading material becomes moistened by batter from the food products processed through the machine. This can change the way in which the breading material flows as it is conveyed through the reservoir. In some circumstances breading material can become packed as it is "pumped" through the reservoir toward the breading station. In such cases breading material sometimes wells up and spills out of the machine.

Prior art machines were sometimes constructed with a one-piece tamper located at the breading station for spreading breading material over the food products. The prior art tampers were formed by relatively heavy gage, circularly curved, sheet metal members. The tamper radii of curvature were large so the tampers were gently curved. The convex side of the tamper rode on products passing through the breading station. When used for breading "flat" food products, like ground veal patties, these tampers were ineffective to fully bread the product because they did not sufficiently mound breading material at the breading station. Flat food products often had unbreaded, central "seams" along the upper sides.

Health regulations or restaurant policies dictate that food processing machines be thoroughly cleaned on a regular basis. Breading machines are constructed so that they may be disassembled-by hand-quickly and easily for cleaning. Such machines are often fabricated from stainless steel sheet metal parts, stainless steel shafts, conveyor belts, etc. that lend themselves to frequent cleaning, but are heavy.

In the past, restaurant workers lifted and carried the breading reservoir and associated components when cleaning the machine or changing the breading material. For example, changing the product being breaded sometimes requires changing the breading material being applied. The breading material reservoir must be emptied and refilled. When the machine must be cleaned, the reservoir, which may be full of recycled breading material that has been thoroughly moistened by batter, must be emptied. In each case, the machine components forming the reservoir and associated components, together with sodden breading material in the reservoir, can make the reservoir and associated parts quite heavy. Furthermore, the reservoirs, with their associated components, are unwieldy.

Prior art breading machines were so constructed and arranged that removing breading material from the breading reservoirs was time consuming. The simplest method for removing the breading material was to pick up the reservoir and associated components and tip the reservoir enough to dump the breading. This procedure often required partially disassembling the machine—e.g. removing the conveyor driving connections.

The present invention provides a new and improved breading machine and method of operating a breading machine wherein the breading material reservoir is emptied quickly and easily without lifting or otherwise moving the reservoir.

The invention further provides a new an improved breading machine having a one-piece tamper that is constructed and arranged for mounding breading material so that flat food products passing through the machine are fully breaded.

Still further, the invention provides a new and improved breading machine wherein packed breading material being conveyed to the breading station does not spill from the reservoir.

SUMMARY OF THE INVENTION

According to a preferred embodiment of the invention a new and improved method of operating a food product breading machine is provided wherein food products and breading material are conveyed through a breading station after which the breaded food products are delivered from the machine while unused breading material is recycled through the machine. The method comprises depositing breading material in a breading reservoir; training a perforate conveyor belt through the breading reservoir, a food product loading location, the breading station, a breaded food product discharge location, and back to the reservoir; and, driving the conveyor belt to pass food products through the machine while recycling unused breading material. The conveyor belt delivers breading material from the reservoir to the food product loading location and conveys the breading material and food product along a surface extending from the food product loading location to the breading station. After passing through the breading station, the breading material is dropped through the conveyor belt into the reservoir via a reservoir intake opening while the breaded food products are conveyed from the breading station to the discharge location. The breading material reservoir is emptied by positioning a breading material support member below the conveyor belt between the breading station and the discharge location, diverting breading material from being recycled through the reservoir, and conveying breading material from the breading station to the discharge location.

According to a preferred embodiment of the invention a food product breading machine is provided that comprises a breading material reservoir, a breading station, a food product loading location, a discharge location from which breaded food products are discharged from the machine, and a perforate conveyor belt extending through the reservoir, the loading location, the breading station, and the discharge location. A breading material support supports breading material at the breading station. Breading material exiting the breading station falls through the conveyor and a reservoir intake opening below the conveyor belt between the breading station and the discharge location. Breaded food products remain on the belt and are conveyed to the discharge location. A breading support member is movable to a position beneath the conveyor belt between the breading station and the discharge location for preventing breading material from falling from the conveyor through the reservoir intake opening while supporting breading material adjacent the belt so that the breading material is conveyed to the discharge location and the reservoir is emptied.

In another preferred embodiment of the invention a food product breading machine is provided that comprises a breading material reservoir, a breading station, a food product loading location, a discharge location from which breaded food products are discharged from the machine, and a conveyor system extending through the reservoir, the loading location, the breading station, and the discharge location. A breading material support supports breading material at the breading station. A one-piece breading flow restrictor located at the breading station rides over food products passing through the breading station. The flow restrictor is supported adjacent one end by the breading machine and is biased toward engagement with food products at the breading station. The restrictor has a side confronting the breading station defining a projecting lobe that mounds breading material at the breading station and assures that flat food products passing the breading station are fully breaded.

According to another preferred embodiment of the invention, a food product breading machine is provided that comprises a breading material reservoir, a breading station, a food product loading location, a discharge location from which breaded food products are discharged from the machine, and a conveyor belt extending through the reservoir, the loading location, the breading station, and the discharge location, with the conveyor belt conveying breading material from the reservoir to the loading location and then to the breading station. A breading material support supports breading material at the breading station and extends toward the loading location for supporting breading material being conveyed to the breading station. A breading deflector flange projects from a reservoir wall toward the loading location for deflecting packed breading material being conveyed to the loading location that would otherwise spill from the reservoir.

Additional features and advantages of the invention will become apparent from the following detailed description of a preferred embodiment made with reference to the drawings which form part of the specification.

BRIEF DESCRIPTION OF THE DRAWINGS

FIG. 6 is a view similar to FIG. 3 illustrating an alternative embodiment of the invention; and, FIG. 7 is a view seen approximately from the plane indicated by the line 7—7 of FIG. 6.

DESCRIPTION OF THE BEST MODES CONTEMPLATED OF CARRYING OUT THE INVENTION

Figure 1:
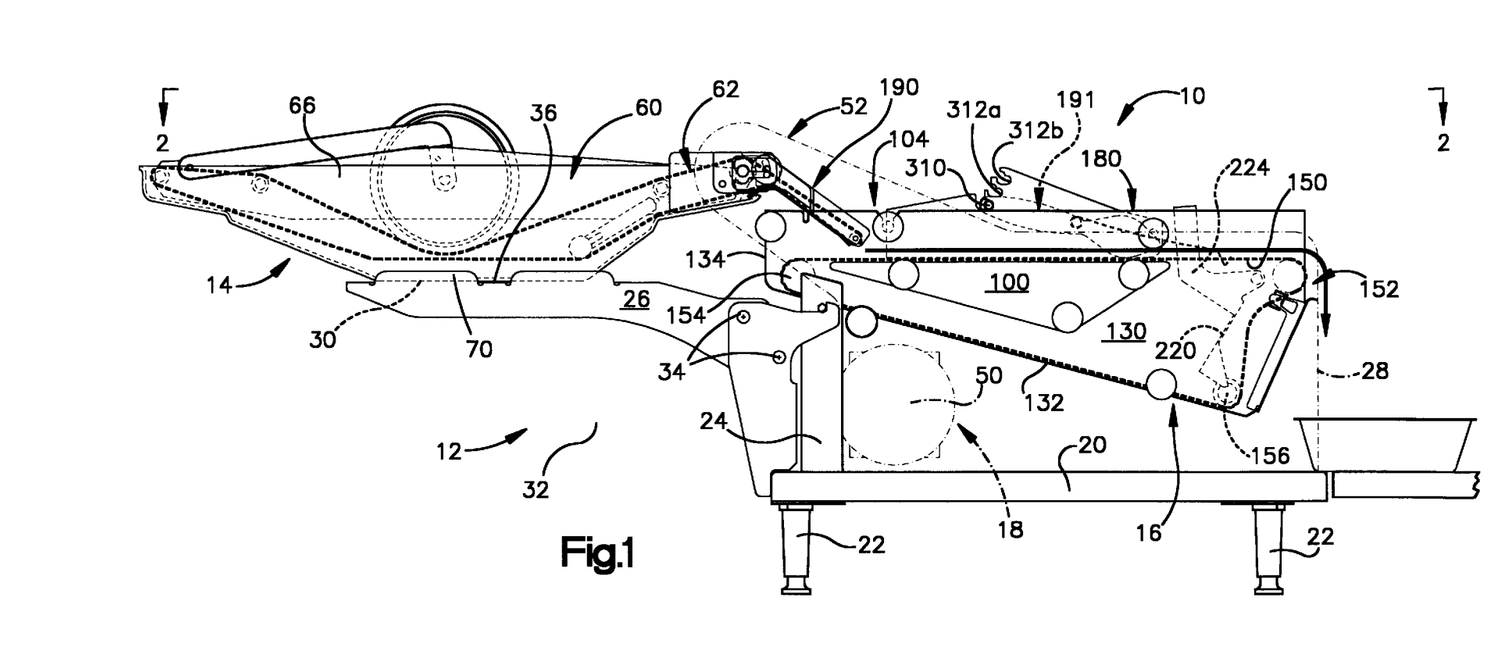
FIG. 1 is an elevation view of a food product breading machine constructed according to the invention with parts removed and parts schematically shown.
Figure 2:
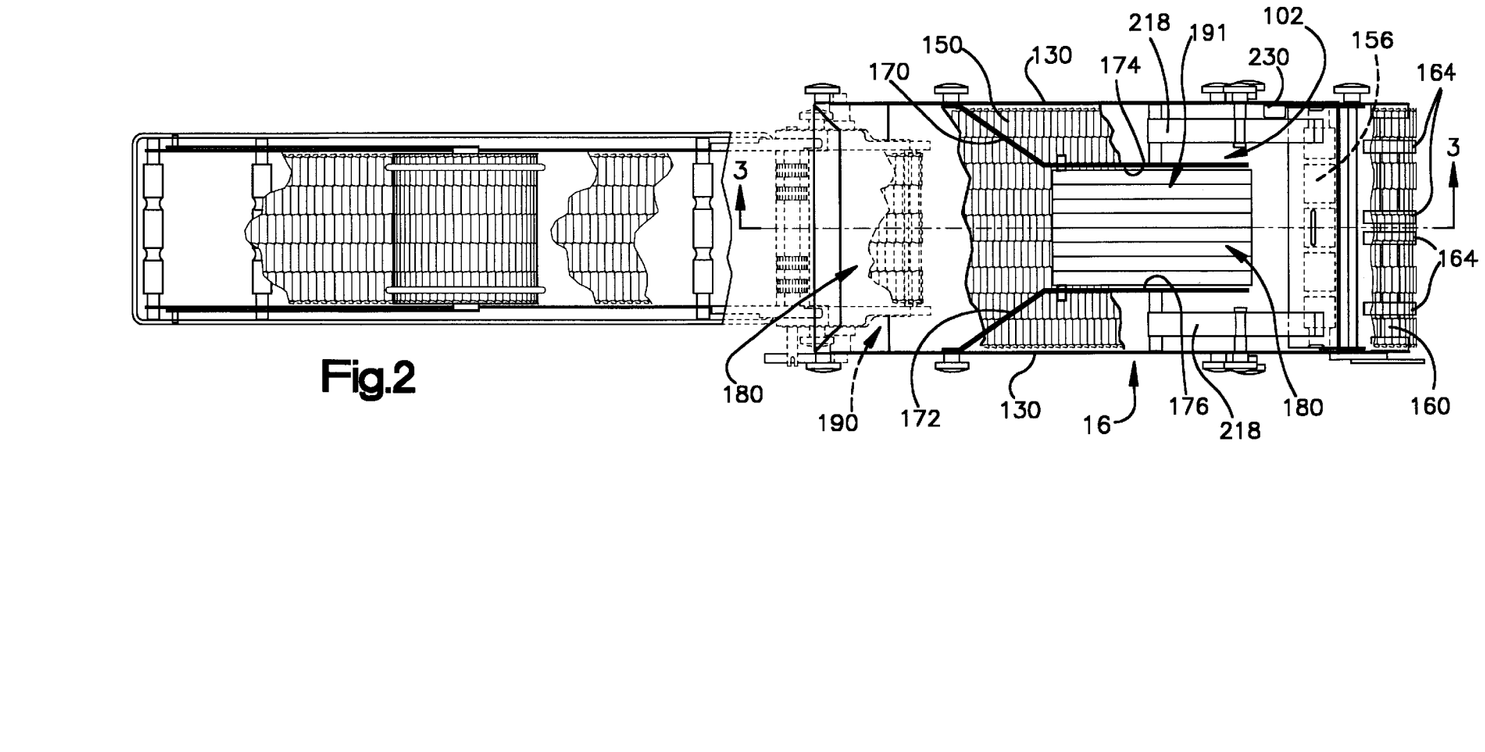
FIG. 2 is a top plan view of the machine of FIG. 1 seen approximately from the plane indicated by the line 2—2 of FIG. 1, with parts removed, parts broken away, and parts shown in phantom lines.

A food product breading machine 10 constructed according to the invention is illustrated in the drawings. The machine 10 is especially useful in restaurant settings where individual food products, such as chicken parts, cut vegetables, fish filets, etc., are fried to order. The machine 10 coats individual food items with a fluent batter and then overcoats them with a particulate breading material that clings to the batter. The breaded items are discharged from the machine in condition for frying. Referring in particular to FIGS. 1 and 2, the machine 10 comprises a supporting framework 12, a battering unit 14, a breading unit 16, and a drive system 18.

The framework 12 is preferably constructed and arranged so that the battering and breading units are detachably supported and easily removable for cleaning without requiring the use of tools. In the illustrated embodiment, the framework 12 comprises a base plate 20, support legs 22, stanchions 24 projecting upwardly from the base plate, a battering unit support structure 26, and a breading unit support structure 28 (schematically illustrated). The legs 22 are sized so that the machine 10 may be placed on a table top or counter during use.

The battering unit support structure 26 projects from one end of the framework 12 and carries a battering unit seat 30 near its projecting end. The illustrated support structure 26 is formed by spaced side plates 32 that are rigidly connected together by cross bars 34. The side plates 32 are anchored between the stanchions 24 and supported on the base plate 20 so that the structure 26 projects, cantilever fashion, from the base plate. The battering unit seat 30 is preferably formed by a plate 36 defining a flat supporting surface bounded by an up-turned peripheral flange. The support surface extends laterally between the side plates 32 near their projecting ends. The battering unit rests on the plate 36 so that it may be lifted onto and off of the machine.

The breading unit support structure 28 provides a seat for the breading unit and comprises sheet metal side-walls (shown schematically) respectively supported by the base plate on opposite lateral sides of the breading unit. The side-walls are rigidly attached together to receive and support the breading unit so that it may be lifted to and from the machine.

The drive system 18 is constructed and arranged to drive food product conveyors associated with the battering and breading units so that food products may move substantially continuously through the machine 10. The illustrated drive system 18 comprises a drive motor 50 and a drive transmission 52 between the motor and the conveyors. The motor 50 is preferably an electric motor that is anchored between the stanchions 24. The drive transmission 52 is preferably a chain drive (not illustrated) and a chain guard structure (schematically shown in FIG. 1).

The illustrated battering unit 14 receives food items placed in it by an attendant, completely immerses the items in a batter pool, enables excess batter to be shed from the items and delivers the battered items to the breading unit. The battering unit 14 that is illustrated in FIGS. 1 and 2 is described and illustrated in U.S. Pat. No. 5,924,356, issued Jul. 20, 1999 and the illustrations and description there are incorporated herein in their entireties by this reference to that patent. While a battering unit is illustrated and described as associated with the breading unit 16, breading units embodying the present invention may be used with or without an associated battering unit. For example, a breading unit constructed according to the invention may be used to bread food products that are hand dipped into batter and hand fed to the breading unit. Accordingly, the battering unit 14 is not described in further detail. Reference may be made to the aforementioned U.S. Pat. No. 5,924,356 for further description of the battering unit construction.

Battered food items delivered to the breading unit from the battering unit are coated with breading material and delivered from the machine 10 ready for cooking. Breading units embodying the present invention are so constructed and arranged that they may be emptied of breading material extremely quickly and easily for changing the type of breading material being applied or for periodic machine cleaning. In a preferred breading unit construction, breading material is deposited in a breading reservoir, a food product is deposited in the breading unit at a food product loading location, and the food product and the breading material are conveyed to a breading station where the food product is coated with breading material. The breaded food product is conveyed from the breading station to a discharge location and the unused breading material is recycled. The breading material reservoir is emptied by directing breading material to the discharge location from the breading station and diverting the breading material from being recycled through the reservoir.

Figures 3, 4, 5:
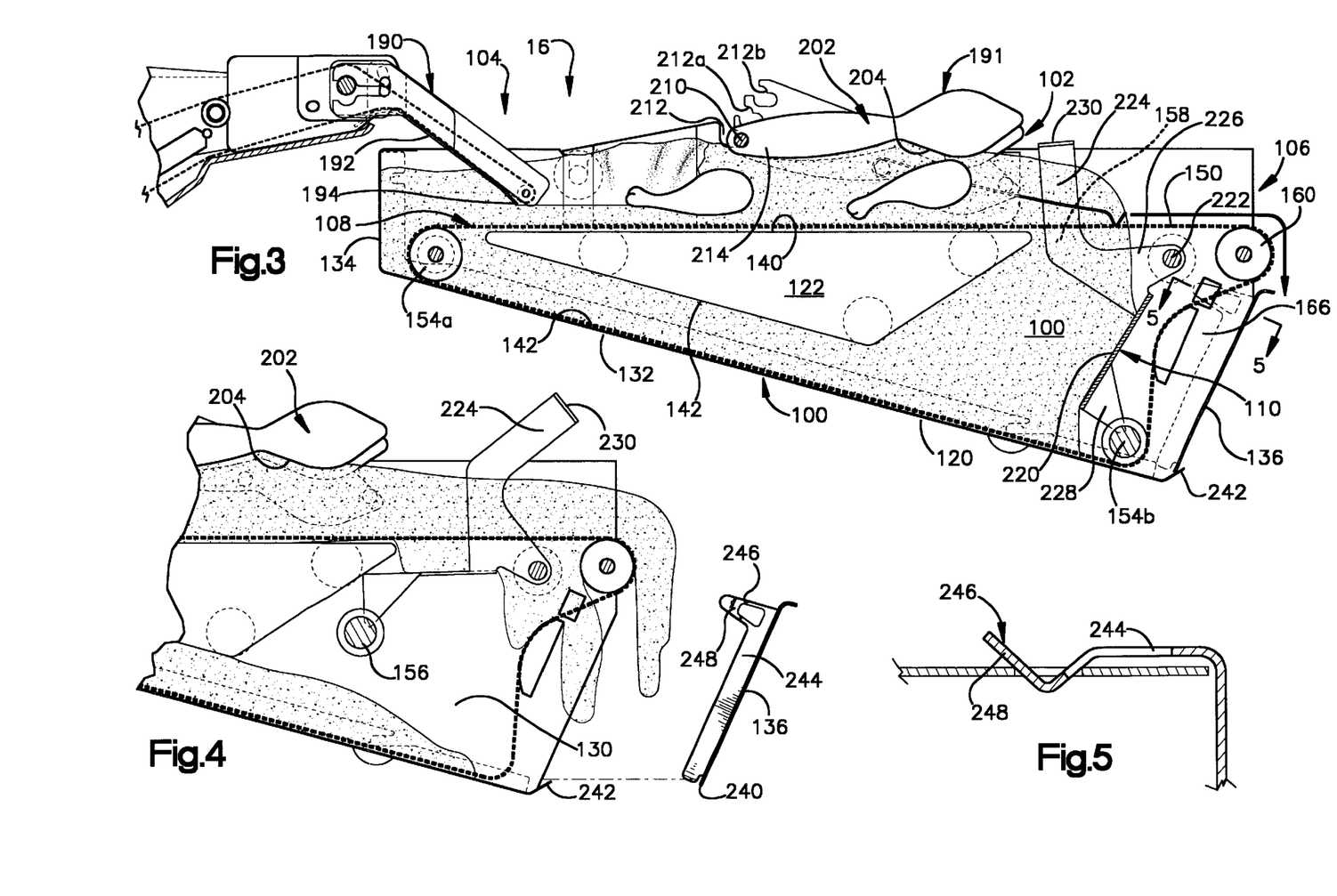
FIG. 3 is an enlarged cross sectional view of part of the machine of FIG. 2 seen approximately from the plane indicated by the line 3—3 of FIG. 2 with parts removed, parts broken away, and illustrated with food products and breading material in the machine.
FIG. 4 is a view of part of the breading machine shown in FIG. 3 with parts illustrated in alternate positions.
FIG. 5 is a cross sectional view seen approximately from the plane indicated by the line 5—5 of FIG. 3.

A preferred breading unit 16 is illustrated by FIGS. 3–5 as comprising a breading material reservoir 100, a breading application station 102 in an uppermost reservoir section, a food item loading location 104, a discharge location 106, a conveyor system 108 for moving food products and breading material through the reservoir 100, and a breading material director 110 for directing breading material from the breading station 102 to the discharge location 106 and diverting breading material from being recycled through the reservoir 100 when the breading unit is being emptied of breading material.

The reservoir 100 is constructed and arranged so that breading material that is not applied to food items passing through the station 102 is recirculated through the reservoir by the conveyor. The reservoir 100 comprises a breading pan, or hopper, 120, and a core 122 (See FIG. 3) disposed within the hopper 120 for establishing a breading material recirculation path.

The illustrated hopper 120 is an open top box-like construction defining parallel vertical side-walls 130, a shallow sloped base 132, a vertical end-wall 134 adjacent the loading location 104, and a steeply sloped opposite end-panel 136 over which breaded food items are delivered from the breading unit. The preferred hopper 120 is constructed from sheet stainless steel. The hopper is detachably secured to the framework 12 by suitable clamps formed in part by handknobs so that the hopper is removable from the framework without using tools.

The core 122 supports breading material moving toward the breading station and confines breading material flowing upwardly from the bottom of the hopper 120 to a space adjacent the hopper base 132. The core 122 has a generally triangular cross sectional shape and extends between the side-walls 130 completely across the hopper 120. The core defines a breading supporting surface 140 extending beneath the loading location 104 and the breading station 102, and a breading guide wall 142. The guide wall 142 extends parallel to the hopper base 132 and defines, with the base 132, a passage 143 through which the breading moves upwardly to the loading location 104. The height of the passage 143 is selected so that the passage does not restrict the amount of breading that can be delivered to the loading location. The preferred core 122 is a hermetic can-like construction made from welded sheet stainless steel. The core is detachably secured in the hopper by screws that are turned by hand-knob operated clamping elements.

The conveyor 108 propels the food products and breading material through the breading station 102. The conveyor delivers food products to the discharge location 106 and recirculates unused breading material through the reservoir 100. The illustrated and preferred conveyor 108 comprises a conveyor belt 150, a conveyor drive assembly 152, a belt supporting shaft 154, and a tensioning shaft 156. The belt 150 is constructed from wire links that extend fully across the breading unit width. The belt construction is such that when it moves through the particulate breading material in the passage 143 and along the breading support surface 140, the breading material is effectively fluidized and swept along with the belt in a manner that emulates fluid flow.

The wire links provide a perforate, open mesh belt that supports the food products, but does not support a significant amount of breading material in the absence of an underlying support surface. The breading support surface 140 terminates at the outlet of the breading station 102 and defines, at its end, a reservoir intake opening 158. As breading material and food products emerge from the breading station 102 on the belt 150, the unused breading material bridges the conveyor belt wires and is briefly carried along without an underlying support. Belt vibrations break up the breading bridges and the breading falls from the belt through the intake opening 158 to the bottom of the reservoir. Even though the open mesh wire belt is not suitable for supporting the breading material, the breading is readily circulated in the reservoir when the belt moves along the underlying surfaces 140, 142. The breaded food products proceed to the discharge location 106 from which they are delivered from the machine 10 over the hopper end-wall 136. It should be noted that the reservoir is initially filled with breading material by dumping the breading through the belt 150 and the intake opening 158.

The drive assembly controls the belt motion. The illustrated and preferred drive assembly comprises a drive shaft 160 journaled between the side-walls 130, an input drive sprocket (not illustrated) fixed to a shaft end projecting laterally from the hopper, a series of laterally spaced belt driving sprockets 164 (FIG. 2) fixed to the shaft 160, and a belt wrapping unit 166. The input drive sprocket runs in mesh with a chain driven by the motor 50. The belt driving sprocket teeth project through the belt—engaging the linked wires forming the belt—at several locations proceeding across the width of the breading unit to transmit drive from the motor to the belt. The belt wrapping unit 166 comprises a pair of semicircular belt engaging guides (only one of which is illustrated) that are spaced laterally apart and immediately below and adjacent the shaft 160. The guides maintain the belt engaged with the drive shaft through about 180° around the shaft centerline and assure that the belt does not "jump" off of the sprockets.

The shaft 154 supports the belt 150 so that, when the belt is driven, breading material circulation through the passage 143 and along the breading support surface 140 are assured. The belt 150 is trained around the supporting shaft 154 so that the belt upper reach extends along the breading support surface 140. The lower reach extends parallel to and between the hopper base 132 and the guide face 142 between the shafts 154 and 156. The shaft 154 is supported by and between the side-walls 130 in a fixed position and is fixed against rotation. It is formed from a smooth steel rod so the belt slides freely over it with minimal friction.

The shaft 156 is heavy and gravity biased against the belt 150 to tension it. The shaft 156 is illustrated in its normal position in which it maintains the belt lower reach parallel to the base 132. In the event the belt tension should increase, for example if something becomes entangled in the belt, the increased belt tension moves the shaft 156 against the gravitational biasing force to detension the belt. The shaft 156 is preferably a smooth stainless steel member that is fixed against rotation so the belt slides over the shaft periphery.

In the illustrated breading unit the breading application station 102 is a straight chute, or throat-like passage, along the breading unit 16 centerline that is narrower than the belt 150 and through which the food items pass. The illustrated station 102 is formed by panel walls 170,172 that are connected to respective opposite breading unit side-walls (See FIG. 2). The panel walls converge proceeding inwardly from the side-walls in the direction of belt travel. At the station 102 the panel walls form respective parallel breading station side-walls 174,176. Each panel defines a lower edge that is disposed just above the belt upper reach. Fluidized breading material flowing along the breading support surface 140 and above the belt 150 impinges on and is deflected by the converging panel wall sections 170,172. The breading material flow is concentrated as it moves toward the station so the breading material depth increases (See FIG. 3). Food items on the conveyor that are not aligned with the travel path centerline are guided through the station by the converging panel walls.

A breading flow control system 180 both controls and restricts the passage of breading material through the station 102 without impeding the movement of food items. Food items passing through the station are inundated by breading material accumulated at the station 102. The breading flow control system 180 comprises a breading diverter unit 190 for deflecting breading material on the conveyor as the material moves to the loading location 104 and a breading flow restrictor 191 for creating a standing wave of breading material at the station 102.

The diverter unit 190 comprises a breading plow 192 (FIG. 3) projecting over the conveyor belt 150 at the loading location 104, and connector structure detachably securing the plow 192 in adjusted positions relative to the breading conveyor. The preferred plow 192 comprises a plate-like rectangular member having a projecting side 194 that extends laterally across the travel path. When the plow side 194 extends into the breading material being moved by the conveyor, it diverts some of the breading flow around the opposite plow plate ends. The diverted breading forms continuous parallel breading mounds on opposite lateral sides of a central furrow. The mounds move with the conveyor and impinge on the converging wall sections 170, 172. The wall sections 170, 172 build the height of the accumulating breading material moving along them until the breading material breaks like a wave at each side of the breading application station. When a food item is passing the application station the breading material waves break over the item. At substantially the same time the food item passes into and through the standing wave of breading material that has accumulated just upstream from the breading flow restrictor 191.

The plow position is adjusted to control the height of the breading mounds impinging on the converging panel walls 170, 172. The connector structure fixes the plow side 194 in various desired elevations over the conveyor belt 150 so that differing amounts of the breading material can be diverted around the sides of the plate. The connector structure comprises hand-knob driven screw clamps that are manually loosened and retightened to clamp the plow in adjusted positions.

Depending on conditions, such as breading material consistency and moisture content as well as plow and restrictor member positioning, the breading material pumped upwardly to the loading location 104 through the passage 143 can become packed and restricted after it emerges from the passage 143. This results in the breading material welling up behind—or upstream from—the plow 192. When the breading material wells up, it tends to spill over the reservoir end-wall 134.

According to the present invention such breading material spillage is prevented by a breading diverter 196 that projects from the wall 134 above the upper end of the passage 143 and toward the breading station 102. Breading material that becomes packed in the passage 143 or otherwise tends to well up behind the plow 192 is engaged by the diverter 196 and is directed laterally toward respective reservoir side-walls 130. The diverted breading material is swept away by the belt 150 without spilling out of the hopper. The illustrated diverter 196 is formed by a lip-like flange projecting from, and continuous with, the upper side of the wall 134. The laterally opposite flange ends are angled laterally inwardly towards the centerline of the belt 150 (see FIG. 2) and serve to direct the diverted breading that emerges from under the flange 196 away from the wall 134.

The breading flow restrictor 191 engages food items at the breading application station for enabling breaded items to pass through the station while restricting the flow of breading material from the station. The flow restrictor 191 comprises a plurality of flow restrictor members 202 respectively supported above the surface 140 and the belt 150 at the station 102. Each restrictor member 202 defines a surface 204 biased toward the conveyor. The surfaces 204 are disposed adjacent each other proceeding laterally across the station 102. The surfaces 204 are aligned normal to the travel path. When the surfaces 204 are horizontally aligned and adjacent the belt, they collectively provide a virtually continuous obstruction to breading material that would otherwise pass unobstructed through the station 102 above the level of the belt 150. The surfaces 204 are biased toward the conveyor by the weight of each member 202.

The surfaces 204 mound the breading material just upstream from the station 102 and create a standing wave of the material. When sufficient breading material has mounded upstream from a restrictor member 202 the breading material pressure exerted on the member 202 raises the member from the conveyor and breading material passes under the member 202 from the breading station. The amount of breading material passing under the member 202 depends on the conveyor speed, the breading material consistency, and the member weight and position. The conveyor speed is relatively constant so an equilibrium state typically is reached where a relatively constant amount of breading material flows under a given restrictor member.

When a food item moves into the station, those restrictor member surfaces that engage the item shift upwardly and move in conformity with the food item profile as it passes the raised restrictor member (see FIG. 3). The restrictor thus operates to tamp the passing food item without interfering with food item movement. At the same time the restrictor member in question obstructs nearly all but a surface coating of breading material from passing through the station 102 on the food item in line with the restrictor member. Restrictor members that do not engage the food item remain in their initial, equilibrium positions adjacent the belt.

In addition to their individual tamping and breading flow restricting functions, the restrictor members collectively act to compress the breading material against the food items at the application station. Because of the fluidic nature of the breading material moving along the conveyor, the restrictor members engaging the breading pressurize it and, in effect, pack the breading against the food item even at locations along the lateral sides of the items where a restrictor member is not tamping the item.

In the illustrated machine 10 each restrictor member is pivoted about an axis extending between the panel walls 170, 172. In the illustrated machine, a pivot shaft 210 is detachably carried in respective panel-wall notches 212 and extends through a conforming hole in the end 214 of each restrictor member 202 remote from the surface 204. Thus as the restrictor members engage the food items the surfaces 204 ride over the items as the restrictor members pivot about the axis of the shaft 210 at their remote ends. Additional notches 212a, 212b are provided so that the angularity between the restrictor members and the conveyor can be adjusted by repositioning the pivot shaft between alternative notches. This changes the restrictor member biasing force and alters the breading material pressure at the breading station.

When the food items emerge from the breading station, breading material that passes under the restrictor members and breading material that does not cling to the food items drops through the conveyor belt 150 and is recycled through the breading unit via the intake opening 158. Some breading may cling to the conveyor belt wires emerging from the application station. Further, when the breading material is dampened from batter, clumps of the material may bridge the wire mesh forming the belt 150 and could be discharged from the unit rather than being returned to the reservoir. In the illustrated breading unit, spring leafs 218 are resiliently biased against the belt 150 and repeatedly strike the belt as it moves. The repetitive spring leaf impacts on the belt create vibrations that dislodge breading material from the belt so that it falls through the opening 158 and is recycled. The spring leafs are supported and tensioned by dowel pins that project from the unit side-walls. The spring leafs are removable from the unit by sliding them off of the dowel pins.

According to the present invention emptying the reservoir of breading material is accomplished quickly and easily without requiring lifting and manually dumping the reservoir and without partially disassembling the breading machine conveyor drive system. When breading material must be emptied from the reservoir the breading material director 110 directs breading material from the breading station 102 to the discharge location 106 and diverts breading material from being recycled through the reservoir. The preferred and illustrated breading material director 110 is moved to a position where breading material is supported beneath the conveyor belt 150 between the breading station and the discharge location 106 so that the breading material is discharged from the reservoir by the belt instead of falling from the conveyor through the reservoir intake opening. Referring to FIGS. 3 and 4 the illustrated breading material director 110 comprises a breading material support plate 220 supported below the conveyor belt adjacent the intake opening 158, a shaft 222 supporting the plate for movement relative to the conveyor belt, and an operating handle 224 for manually positioning the plate beneath the conveyor belt for emptying the reservoir.

The support plate 220 is illustrated as a sheet metal member having a central body section that extends substantially across the reservoir with its opposite sides disposed adjacent the side-walls 130. The plate defines apertured tabs 226 that are bent out of the plane of the central section and extend to the shaft 222. The shaft 222 extends loosely through the tab apertures so that the plate pivots about the shaft axis. The plate 220 further defines tabs 228 that are bent out of the plane of the central section and extend to the opposite ends of the tensioning shaft 156 where the tabs are bonded to the tensioning shaft, e.g. by weldments. The combined weights of the shaft 156 and the plate 220 maintain the plate 220 positioned as illustrated in FIG. 3 until the belt tension increases for some reason or the machine attendant empties the reservoir. In its FIG. 3 position the plate 220 directs breading material that has fallen from the belt 150 through the opening 158 into the bottom of the reservoir.

The shaft 222 is supported between the side-walls 130 and extends horizontally below the conveyor belt. The shaft is illustrated as removably secured in place by hand-knob operated clamps. The shaft 222 is essentially fixed in place against rotation while the plate 220 is free to rotate about the shaft.

The handle 224 is attached to the plate 220 and is manually gripped by the machine attendant to reposition the plate 220 from its normal position (FIG. 3) to its reservoir emptying position (FIG. 4). The illustrated handle 224 is formed by a sheet metal arm that is integral with one side of the plate 220 and is bent out of the central section plane. The preferred handle 224 projects from the plate 220 along a side-wall 130 upwardly between the side-wall and the conveyor belt 150. A short gripping tab 230 is formed at the projecting handle end by which the handle is grasped by the attendant.

To empty the reservoir, the attendant raises the handle 224 via the tab 230, shifting the plate central section so that it extends parallel to and slightly below the belt 150 (see FIG. 4). The conveyor is operated while the attendant maintains the plate 220 in its raised position. Breading material moves from the breading station to the discharge location while being supported on the plate 220. The breading material is then discharged from the machine.

In the illustrated machine 10 the plate 220 does not extend completely between the breading station and the conveyor drive shaft 160. This gives rise to the possibility that some breading material may fall from the conveyor back into the reservoir after passing over the plate 220. The attendant may disable the springs 218 by sliding them from their supporting dowel pins while the machine is being emptied. When this is done, the conveyor belt vibrations are greatly reduced. Consequently, most of the breading material exiting the breading station remains on the belt after having passed from the plate 220 and is delivered over the end of the machine 10 into a suitable receptacle (as shown, for example in FIG. 1).

In the illustrated and preferred machine 10, the reservoir end-panel 136 is so constructed and arranged that it is easily removed by the attendant for emptying the reservoir. The preferred end-panel (as shown in FIGS. 4 and 5) is formed from a sheet of stainless steel that is easily removable from the reservoir end. The sheet metal end-panel 136 comprises a lower edge 240 that is supported by a flange-like lip 242 projecting from the base 132. The panel-wall also has side flanges 244 that extend along the exterior faces of the side-walls 130. Each flange defines a finger 246 that projects from the flange adjacent its upper side and resiliently engages the adjacent side-wall 130. In the illustrated machine 10 each finger 246 is a resilient spring-like element that is formed with a V-shaped indentation 248. When the end-panel is installed on the reservoir, each indentation 248 is received in a respective hole in the associated side-wall 130 to latch the end-panel 136 in place (see FIG. 5). The machine attendant removes the end-panel 136 by manually flexing the finger 246 outwardly to disengage the indentations from the side-walls. Each illustrated finger 246 has an aperture part way along its length to insure that the finger is easily, yet resiliently, flexed during end-panel removal and replacement.

Removing the end-panel 136 speeds the reservoir emptying process by allowing breading material that otherwise would be shed from the conveyor belt 150 and returned to the hopper base to instead fall from the machine. As seen in FIG. 4, the breading material is discharged from the machine along a travel path that extends in part through the space occupied by the end-panel before its removal.

When the machine is to be refilled with breading material, the reservoir is emptied, the handle 224 is released, the end-panel 136 and springs 218 are replaced (assuming they were removed) and the reservoir is refilled with breading material. If the reservoir is emptied for the purpose of cleaning the machine 10, the machine is simply disassembled and cleaned after the breading material is emptied.

Figures 6, 7:
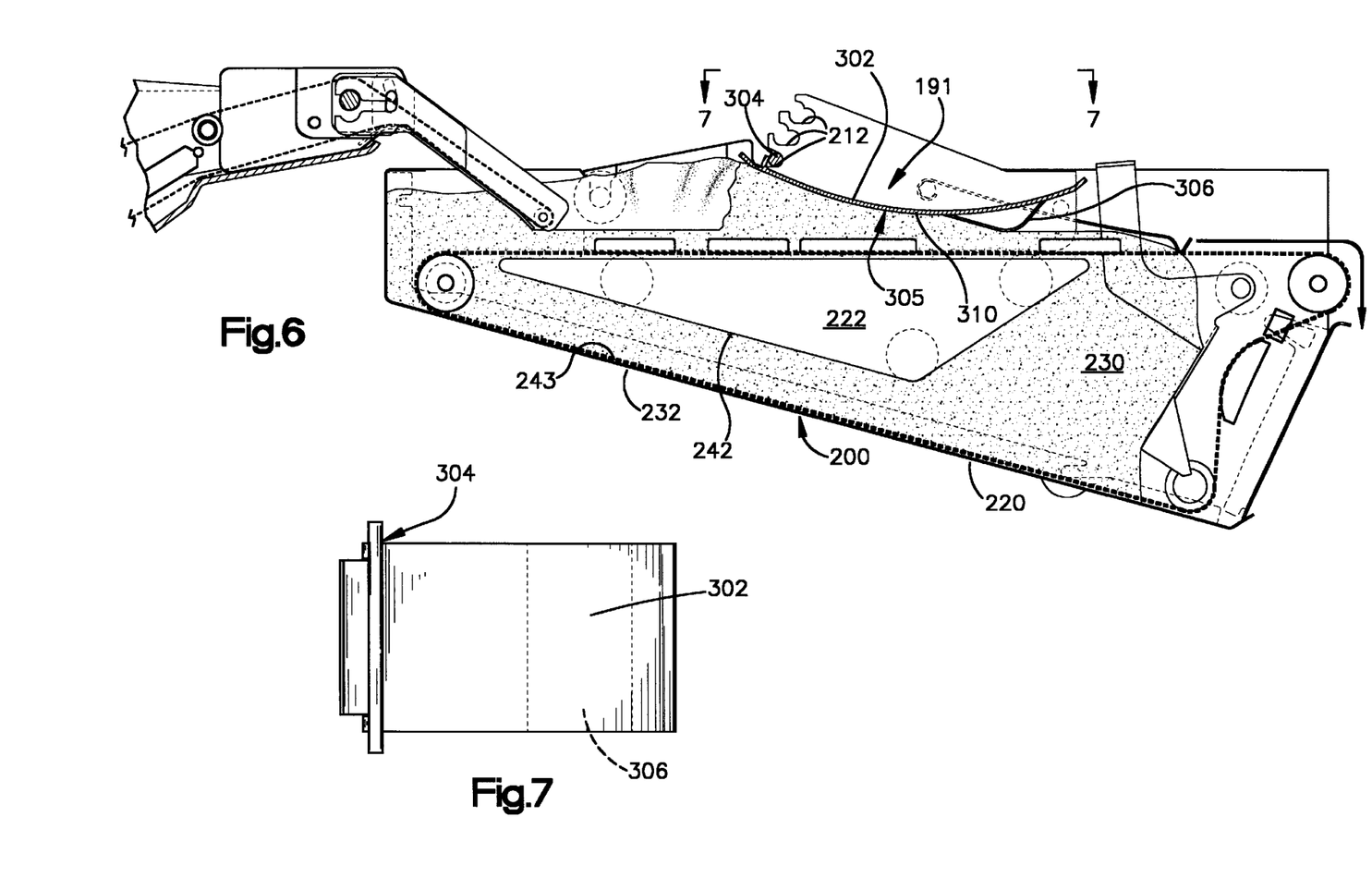

Drawing FIGS. 6 and 7 illustrate a modified embodiment of a machine constructed according to the invention for breading thin, flat food items. The machine is illustrated with thin patties being conveyed through the breading station, although other kinds of food items, such as onion rings, fish fillets, cutlets, etc., can be handled by the machine. The machine of FIGS. 6 and 7 is identical to the machine of FIGS. 1–5 except that the breading flow restrictor 191 is formed by a one-piece restrictor member 302 located at the breading station and biased toward engagement with food products on the conveyor belt for riding over food products passing through the breading station. The restrictor both mounds the breading material behind—or "upstream" from—it, but also tamps the breaded food products as it rides over them. Because the machine of FIGS. 6 and 7 is the same as that described above, it is illustrated in part only, identical reference characters are used to indicate corresponding machine parts, and the corresponding parts are not described further.

The restrictor member 302 is so constructed an arranged that breading material passing through the breading station is mounded and spread across the conveyor between the panel walls 170, 172 so that the food items are uniformly covered with the breading material. The member 302 extends substantially completely across the beading station, is supported at one end by the machine 10 via an anchor 304 and has a side 305 confronting the breading station defining a projecting lobe 306 that mounds breading material at the breading station and assures that flat food products passing the breading station are fully breaded.

The plate anchor 304 secures the member 302 to the breading machine adjacent one end of the member so the member is gravity biased toward engagement with a food products at the breading station. The anchor 304 is illustrated as a metal rod-like pivot shaft that extends laterally across the plate 302 with its opposite ends projecting laterally from respective plate sides. The pivot shaft ends are received by one or another of the panel-wall notches 212 so that the member 302 can pivot about the shaft axis. The biasing force urging the member 302 toward engagement with the breading material and food products is adjustable by inserting the shaft ends in different notches 212. In the illustrated machine the pivot shaft is welded to tabs that project from the plate at its opposite sides adjacent the respective panel walls.

The member 302 is preferably a relatively thick stainless steel sheet that is arcuately curved to produce a breading material engaging belly section 310 that extends over the breading station between the shaft 304 and the lobe 306. The belly section 310 converges toward the conveyor belt 150 proceeding toward the lobe. The belly section is urged into contact with the breading material and functions to spread the breading material evenly across the conveyor between the panel-walls.

The lobe 306 projects from the belly section 310 remote from the pivot shaft and functions to mound breading material upstream from the lobe. The mounded breading material contacts the belly section 310 which tends to compress and to flow the mounded material laterally relative to the belt 150 so that the breading material is evenly distributed across the belt. The mounding and spreading functions performed by the lobe and belly section serve to assure that breading material is spread completely across the upwardly facing surfaces of the food products passing through the breading station.

The preferred lobe is formed by a stainless steel sheet that is formed into a trough-like shape and welded to the plate 302. The lobe extends laterally across the plate 302 fully between the opposite plate sides. The preferred lobe is smoothly arcuate and merges smoothly into the plate surface so that it does not damage food items passing through the breading station nor entrap breading material. Opposite ends of the lobe are sealed by stainless steel sheets that are hermetically welded to the lobe ends and to the plate 302 so that breading material can not enter the space within the lobe.

While different embodiments of the invention have been illustrated and described in considerable detail, the invention is not to be considered limited to the precise constructions disclosed. Various adaptations, modifications, and uses of the invention may occur to those skilled in the business to which the invention relates. The intention is to cover all such adaptations, modifications, and uses that come within the spirit or scope of the appended claims.

What is claimed is:

1. A method of operating a food product breading machine that comprises a breading reservoir, a food product loading location, a discharge location, and a food product breading station between the loading location and the discharge location, the method comprising:

depositing breading material in the breading reservoir;

depositing a food product in said breading machine at the food product loading location;

conveying the food product and breading material to said breading station where the food product is coated with breading material;

conveying the breaded food product from the breading station to the discharge location where the breaded food product is discharged from the conveyor;

recycling unused breading material from the breading station through the reservoir; and emptying the breading material reservoir comprising the step of directing breading material from said breading station to said discharge location, discharging said breading material from the machine, and diverting said breading material from said reservoir.

2. The method claimed in claim 1 further comprising removing a breading reservoir end-panel adjacent the discharge location and discharging breading material along a travel path that extends in part through the space occupied by the end-panel before removal.

3. The method claimed in claim 1 wherein conveying said breading and a food product comprises moving a food product and breading material with a perforate conveyor belt and emptying the reservoir further comprises positioning a breading material director below said conveyor belt between said breading station and said discharge location, diverting breading material from falling from said conveyor into said reservoir, and conveying breading material from said breading station to said discharge location.

4. The method claimed in claim 3 wherein positioning the breading material director below the conveyor belt comprises supporting the breading material director below the conveyor and pivoting the breading material director to a location where the director extends adjacent the belt between the breading station and the discharge location.

5. The method claimed in claim 4 wherein pivoting the breading material director comprises manually grasping a material director handle and shifting the material director about a pivot axis adjacent the conveyor belt.

6. The method claimed in claim 1 further comprising deflecting packed breading material being conveyed to the loading location that would otherwise spill from the reservoir.

* * * * *